United States Patent
Ikeda et al.

(10) Patent No.: US 11,532,973 B2
(45) Date of Patent: Dec. 20, 2022

(54) ROTOR CORE RETAINING JIG, MANUFACTURING DEVICE AND MANUFACTURING METHOD FOR MAGNET EMBEDDED CORE

(71) Applicant: Kuroda Precision Industries Ltd., Kanagawa (JP)

(72) Inventors: Masanobu Ikeda, Chikuma (JP); Osamu Fukuyama, Hadano (JP); Tomoaki Murayama, Nagano (JP)

(73) Assignee: KURODA PRECISION INDUSTRIES LTD., Kanagawa (JP)

( * ) Notice: Subject to any disclaimer, the term of this patent is extended or adjusted under 35 U.S.C. 154(b) by 217 days.

(21) Appl. No.: 16/478,650

(22) PCT Filed: Oct. 11, 2018

(86) PCT No.: PCT/JP2018/037977
§ 371 (c)(1),
(2) Date: Jul. 17, 2019

(87) PCT Pub. No.: WO2020/075275
PCT Pub. Date: Apr. 16, 2020

(65) Prior Publication Data
US 2021/0194338 A1 Jun. 24, 2021

(51) Int. Cl.
*H02K 15/03* (2006.01)
*H02K 1/28* (2006.01)
(Continued)

(52) U.S. Cl.
CPC ....... *H02K 15/03* (2013.01); *B29C 45/14065* (2013.01); *H02K 1/28* (2013.01);
(Continued)

(58) Field of Classification Search
CPC .......... H02K 15/03; H02K 1/28; H02K 15/12; H02K 1/276
See application file for complete search history.

(56) References Cited

U.S. PATENT DOCUMENTS 7,275,299 B2 * 10/2007 Kuroyanagi ......... H02K 15/066
29/596
9,705,369 B2 7/2017 Ishimatsu
(Continued)

FOREIGN PATENT DOCUMENTS

| JP | 2014036486 | 2/2014 |
|---|---|---|
| JP | 2014046553 | 3/2014 |

(Continued)

OTHER PUBLICATIONS

Chinese Office Action of CN201880017134.0 dated Jul. 23, 2020, 7 pages.
(Continued)

*Primary Examiner* — Minh N Trinh
(74) *Attorney, Agent, or Firm* — Dority & Manning, P.A.

(57) ABSTRACT

To prevent the axial compressive force that acts on the rotor core from becoming unnecessarily large and to enable a high-quality magnet embedded core to be manufactured efficiently, a retaining jig (10) for a rotor core (2) including a magnet insertion hole (4) forming a through hole defining openings on end surfaces in an axial direction includes: a first plate (12) configured to contact against one of the end surfaces of the rotor core (2) and including a gate (20) configured to communicate with the corresponding opening of the magnet insertion hole (4); a second plate (14) configured to oppose another of the end surfaces of the rotor core (2); a closure member (26) coupled to the second plate (14) via a compression spring member (28) and configured to be capable of closing the opening of the magnet insertion hole (4) on the other of the end surfaces; and a coupling (Continued)

member (30) that couples the first plate (12) and the second plate (14) to each other such that the closure member (26) closes the opening and a spring force of the compression spring member (28) becomes a prescribed value.

11 Claims, 11 Drawing Sheets

(51) Int. Cl.
    *H02K 15/12*         (2006.01)
    *B29C 45/14*         (2006.01)
    *H02K 1/276*         (2022.01)
    *B29L 31/00*         (2006.01)

(52) U.S. Cl.
    CPC ...... *H02K 15/12* (2013.01); *B29L 2031/7498* (2013.01); *H02K 1/276* (2013.01); *Y10T 29/5313* (2015.01); *Y10T 29/53143* (2015.01)

(56) References Cited

U.S. PATENT DOCUMENTS

| | | | |
|---|---|---|---|
| 10,608,513 B2 | 3/2020 | Kino | |
| 11,038,408 B2* | 6/2021 | Fukuyama | ............... H02K 1/28 |
| 2014/0196276 A1* | 7/2014 | Nagai | ............... H02K 15/03 29/598 |
| 2015/0054196 A1* | 2/2015 | Ishimatsu | ............... B29C 45/14 264/263 |
| 2019/0044423 A1* | 2/2019 | Fukuyama | ............ H02K 1/276 |
| 2019/0190361 A1 | 6/2019 | Okudaira et al. | |
| 2021/0194338 A1* | 6/2021 | Ikeda | ............... H02K 1/28 |
| 2021/0242756 A1* | 8/2021 | Ikeda | ............... H02K 15/12 |

FOREIGN PATENT DOCUMENTS

| | | | |
|---|---|---|---|
| JP | 2014079056 | | 5/2014 |
| JP | 2014091220 | | 5/2014 |
| JP | 2015035888 | | 2/2015 |
| JP | 2015192576 | | 11/2015 |
| JP | 2017007353 | | 1/2017 |
| JP | WO2017179547 | * | 10/2017 |
| JP | 2018130026 | | 8/2018 |
| WO | WO2006022392 | | 3/2006 |
| WO | WO2017179398 | | 10/2017 |
| WO | WO2017179547 | | 10/2017 |

OTHER PUBLICATIONS

Supplementary European Search Report for EP18899035 dated Jan. 31, 2020, 4 pages.

* cited by examiner

ROTOR CORE RETAINING JIG, MANUFACTURING DEVICE AND MANUFACTURING METHOD FOR MAGNET EMBEDDED CORE

CROSS REFERENCE TO RELATED APPLICATIONS

This application is the U.S. National Stage entry of International Application Number PCT/JP2018/037977 filed under the Patent Cooperation Treaty having a filing date of Oct. 11, 2018, which is incorporated herein by reference.

TECHNICAL FIELD

The present invention relates to a rotor core retaining jig, a manufacturing device and a manufacturing method for a magnet embedded core.

BACKGROUND ART

As a magnet embedded core used in rotating electric machinery such as an electric motor, there is known a magnet embedded core including a rotor core provided with a magnet insertion hole forming a through hole defining openings on both ends in an axial direction, a magnet disposed in the magnet insertion hole, and resin filling the magnet insertion hole, such that the magnet is fixed to the rotor core by the resin.

As a manufacturing device for a magnet embedded core of this kind, there is known a manufacturing device including an upper die and a lower die for pressurizing the rotor core in the axial direction, an intermediate die having a gate configured to communicate with one opening of the magnet insertion hole and arranged to be located between the upper die and the rotor core or between the lower die and the rotor core, wherein a resin pot is provided in the upper die or the lower die, such that in a state where the other opening of the magnet insertion hole is closed by the upper die, the lower die, or the like, molten resin in the resin pot is pressurized to fill the resin into the magnet insertion hole from the resin pot via the gate (for example, see Patent Documents 1 to 3).

PRIOR ART DOCUMENT(S)

Patent Document(s)

Patent Document 1: JP2014-79056A
Patent Document 2: JP2014-91220A
Patent Document 3: JP2017-7353A

SUMMARY OF THE INVENTION

Task to be Accomplished by the Invention

In the aforementioned manufacturing device for the magnet embedded core, it is necessary to press the upper die or the lower die against the end surface of the rotor core to prevent the resin from leaking from the other opening of the magnet insertion hole to outside, and to press the rotor core against the intermediate die to prevent the resin from leaking from a connection part between the gate and the magnet insertion hole to outside.

In the conventional manufacturing device for the magnet embedded core, because the intermediate die and the rotor core are sandwiched between the upper die and the lower die and are pressurized in the axial direction thereby, both the force pressing the upper die or the lower die against the end surface of the rotor core and the force pressing the rotor core against the intermediate die are determined by the pressurizing force by the upper die and the lower die, and thus, the pressing forces cannot be determined individually.

In the conventional manufacturing device for the magnet embedded core, the axial compressive force that acts on the rotor core may become unnecessarily large, so that deformation such as a warp may be caused in the rotor core to deteriorate the quality of the magnet embedded core.

The present invention has been made in view of such prior art problems, and an object of the present invention is to prevent the axial compressive force that acts on the rotor core from becoming unnecessarily large and to enable a high-quality magnet embedded core to be manufactured efficiently.

Means to Accomplish the Task

A rotor core retaining jig for manufacturing a magnet embedded core according to one embodiment of the present invention is a retaining jig for a rotor core including a magnet insertion hole forming a through hole defining openings on both end surfaces in an axial direction, comprising: a first plate configured to contact against one of the end surfaces of the rotor core and including a gate configured to communicate with the corresponding opening of the magnet insertion hole; a second plate configured to oppose another of the end surfaces of the rotor core; a closure member coupled to the second plate via a compression spring member and configured to be capable of closing the opening of the magnet insertion hole on the other of the end surfaces; and a coupling member that couples the first plate and the second plate to each other such that the closure member closes the opening and a spring force of the compression spring member becomes a prescribed value.

With this rotor core retaining jig, it is possible to prevent the axial compressive force that acts on the rotor core from becoming unnecessarily large.

The rotor core retaining jig of the aforementioned embodiment is used to retain a rotor core including multiple magnet insertion holes, and the closure member is divided into multiple closure members each corresponding to at least one of the magnet insertion holes, and the compression spring is provided for each closure member.

With this rotor core retaining jig, the closure of each magnet insertion hole by the corresponding closure member can be individually performed appropriately.

In the rotor core retaining jig of the aforementioned embodiment, preferably, the coupling member comprises a rod portion and a pair of flange portions provided on either end of the rod portion, and the first plate and the second plate include cutout portions each opening at an outer edge of the corresponding plate and defining a shoulder portion against which the corresponding flange portion contacts.

With this rotor core retaining jig, the fitting of the coupling member to the first plate and the second plate can be made easy.

A manufacturing device of a magnet embedded core according to one embodiment of the present invention is a manufacturing device for a magnet embedded core comprising a rotor core provided with a magnet insertion hole forming a through hole defining openings on end surfaces in an axial direction, a magnet disposed in the magnet insertion hole, and resin filling the magnet insertion hole, the manufacturing device comprising: the rotor core retaining jig according to the aforementioned embodiment; a first member contacting against the first plate of the rotor core retaining jig and provided with a resin pot configured to communicate with the gate; a second member opposing the first member via the rotor core retaining jig and relatively movable toward and away from the first member; a resin introducing device for introducing molten resin from the resin pot into the magnet insertion hole via the gate; and a pressing member located between the second member and the first plate to press the first plate against the first member by a pressurizing force transmitted from the second member to the first plate.

With this manufacturing device for the magnet embedded core, it is possible to prevent the axial compressive force that acts on the rotor core from becoming unnecessarily large and to manufacture a high-quality magnet embedded core efficiently.

In the manufacturing device of the magnet embedded core of the aforementioned embodiment, preferably, the pressing member consists of a rod-like member having a base end fixed to the second member and a free end capable of contacting against the first plate.

With this manufacturing device for the magnet embedded core, the pressing of the first plate by the pressing member can be performed easily and reliably.

In the manufacturing device of the magnet embedded core of the aforementioned embodiment, preferably, the pressing member consists of a rod-like member having a base end fixed to the first plate and a free end capable of contacting against the second member.

With this manufacturing device for the magnet embedded core, the pressing of the first plate by the pressing member can be performed easily and reliably, and the first plate can be made compact.

A manufacturing method of a magnet embedded core according to one embodiment of the present invention is a manufacturing method for a magnet embedded core comprising a rotor core provided with a magnet insertion hole forming a through hole defining openings on both end surfaces in an axial direction, a magnet disposed in the magnet insertion hole, and resin filling the magnet insertion hole, the manufacturing method comprising: a rotor core placing step of placing the rotor core on the first plate of the rotor core retaining jig according to the aforementioned embodiment such that the magnet insertion hole is aligned with the gate; a plate placing step of placing the second plate on the rotor core to close the opening of the magnet insertion hole with the closure member; a plate coupling step of coupling the first plate and the second plate to each other with the coupling member, with the rotor core being sandwiched by the first plate and the second plate; a jig placing step of placing the rotor core retaining jig on a first member provided with a resin pot such that the gate communicates with the resin pot; a plate pressing step of pressing the first plate against the first member using a pressing member provided between the first member and a second member relatively movable toward and away from the first member, the first plate being pressed against the first member in response to relative movement of the second member toward the first member; and a resin introducing step of introducing molten resin from the resin pot into the magnet insertion hole via the gate.

With this manufacturing method for the magnet embedded core, it is possible to prevent the axial compressive force that acts on the rotor core from becoming unnecessarily large and to manufacture a high-quality magnet embedded core efficiently.

The manufacturing method for the magnet embedded core of the aforementioned embodiment preferably comprises, prior to the plate placing step, a resin inserting step of inserting solid resin into the resin pot, and the resin introducing step comprises a melting step of causing the solid resin inserted into the resin pot to melt in the resin pot and a pressurizing step of pressurizing the molten resin to introduce the molten resin into the magnet insertion hole.

With this manufacturing method for the magnet embedded core, the use of solid resin can reduce wasteful consumption of the resin.

Effect of the Invention

Thus, according to the embodiment of the present invention, it is possible to prevent the axial compressive force that acts on the rotor core from becoming unnecessarily large and to manufacture a high-quality magnet embedded core efficiently.

MODES FOR CARRYING OUT THE INVENTION

Preferred embodiments of the present invention are described in the following with reference to the appended drawings.

First of all, a magnet embedded core 1 manufactured by a manufacturing device and a manufacturing method according to an embodiment of the present invention is described with reference to FIGS. 1 and 2.

The magnet embedded core 1 is a component part of rotating machinery such as an electric motor, and includes a rotor core 2. The rotor core 2 consists of a laminated iron core formed by laminating a plurality of electromagnetic steel sheets and joining the electromagnetic steel sheets together by using a known joining method (such as crimping, laser welding, gluing, etc.). The rotor core 2 is substantially annular in shape in plan view, and is centrally provided with a shaft hole 3 extending therethrough in an axial direction.

The rotor core 2 is formed with a plurality of magnet insertion holes 4 each defining a substantially rectangular space. The magnet insertion holes 4 extend through the rotor core 2 in the axial direction, and each open out at both of the end surfaces of the rotor core 2. In the illustrated embodiment, the magnet insertion holes 4 are formed in four locations that are circumferentially arranged at a regular interval. However, the magnet insertion holes 4 are not limited to this embodiment, but can be arranged in any other different way with regard to shape, number and arrangement.

A substantially rectangular parallelepiped shaped magnet 5 is received in each magnet insertion hole 4. Each magnet 5 may consist of, for example, a ferrite-based sintered magnet or a permanent magnet (with or without magnetization) such as a neodymium magnet. The dimensions of each magnet 5 are slightly smaller than the corresponding dimensions of the magnet insertion hole 4. As a result, a gap is created between the rotor core 2 and the magnet 5 in each magnet insertion hole 4. This gap is filled with resin 6 which fixes the magnet 5 to the rotor core 2. The resin 6 may consist of thermosetting resin such as epoxy resin.

Figure 1:
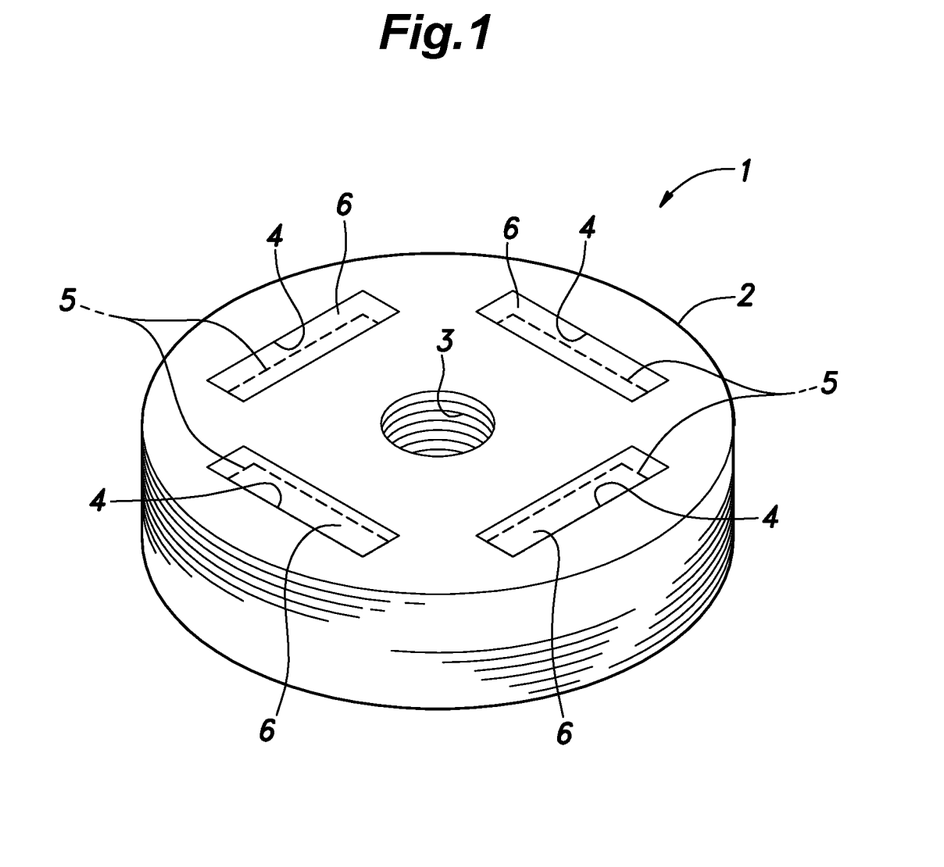
FIG. 1 is a perspective view of an example of a magnet embedded core manufactured by a manufacturing method and a manufacturing device according to one embodiment of the present invention.
Figure 2:
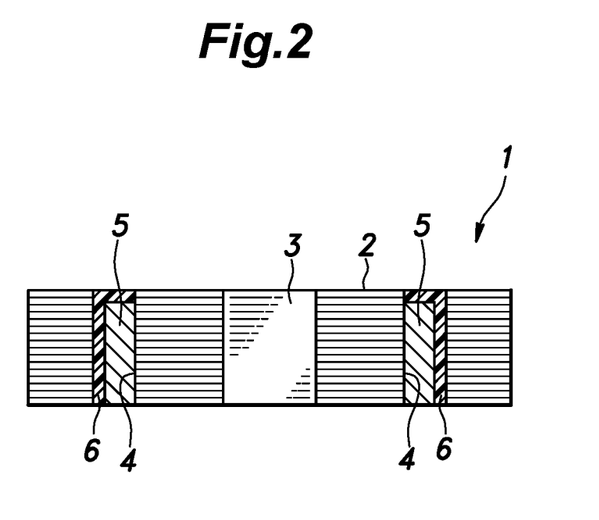
FIG. 2 is a vertical sectional view of the magnet embedded core.

As shown in FIG. 1, the magnet 5 in each magnet insertion hole 4 is inwardly offset (or offset toward the center of the rotor core 2) so that the outer surface of the magnet 5 on the inner side thereof contacts against the inner surface of the magnet insertion hole 4 opposing it. Thereby, the magnets 5 are uniformly arranged in regard to the radial positioning thereof. This, in cooperation with the magnet insertion holes 4 arranged at regular intervals in regard to the circumferential positioning thereof with respect to the rotor core 2, prevents the magnets 5 from causing any rotational imbalance of the rotor core 2. The magnets 5 may also be offset in the opposite radial direction from that shown in FIG. 1 (or offset away from the center of the rotor core 2).

Figure 3:
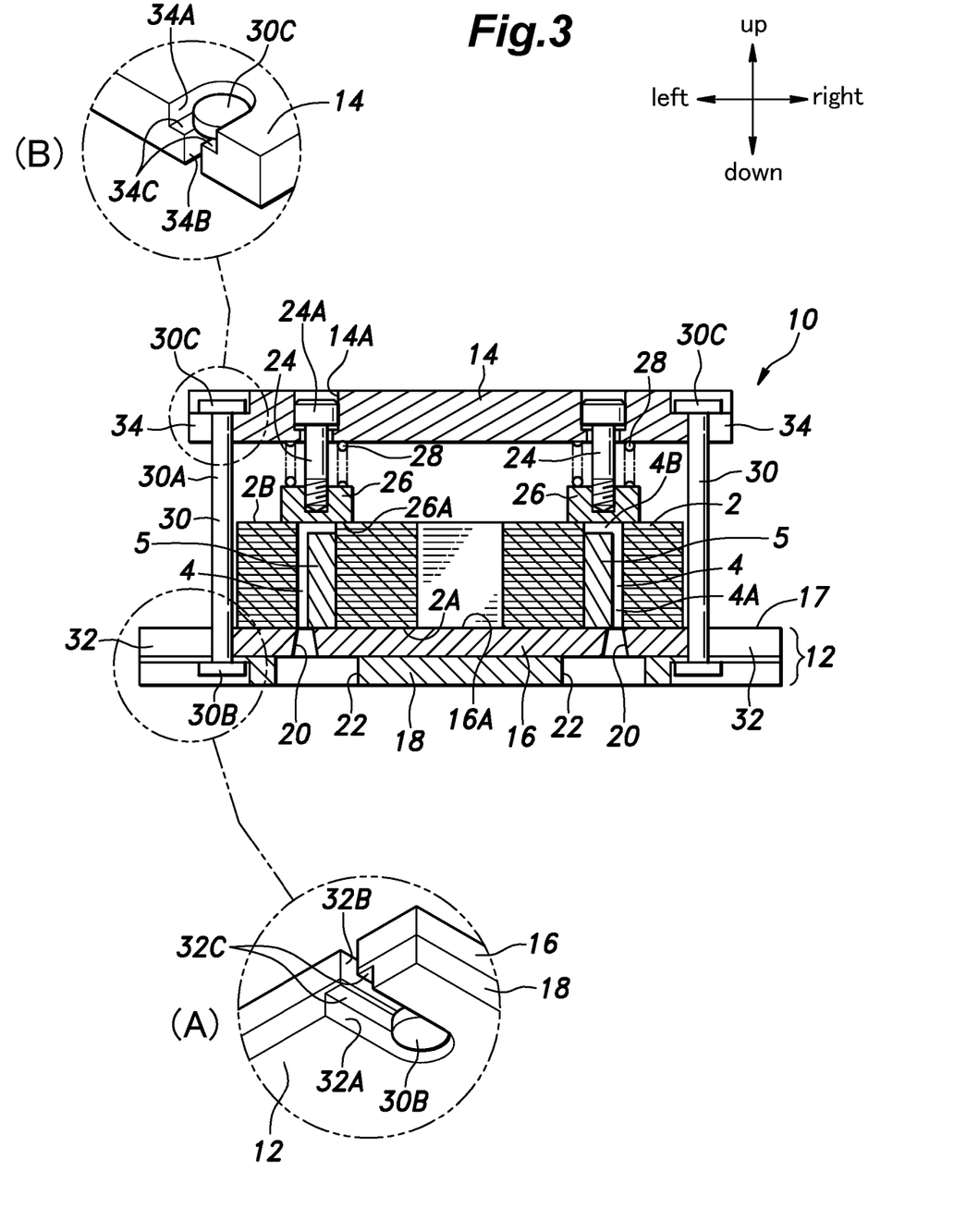
FIG. 3 is a vertical sectional view of a rotor core retaining jig according to the embodiment of the present invention.
Figure 4:
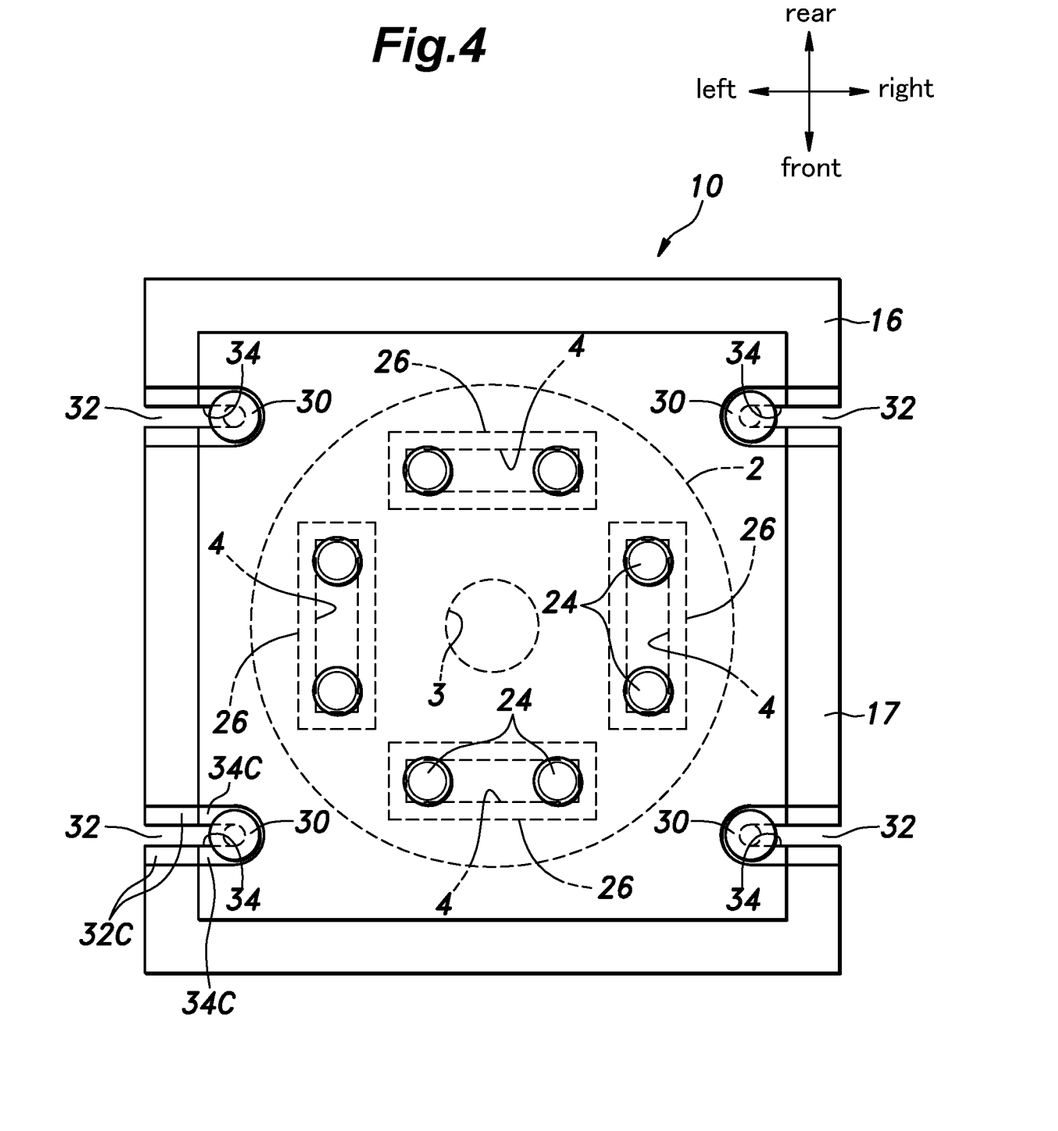
FIG. 4 is a plan view of the rotor core retaining jig according to the embodiment.

Next, with reference to FIGS. 3 and 4, a rotor core retaining jig 10 used in the manufacture of the magnet embedded core will be described.

The rotor core retaining jig 10 includes a lower first plate 12 and an upper second plate 14a that oppose each other.

The first plate 12 is formed of a gate plate 16 and a cull plate 18 each consisting of a rectangular flat plate and overlapping each other. The gate plate 16 and the cull plate 18 may be detachably unified by bolts (not shown). The gate plate 16 has a top surface 16A configured to contact against a lower end surface 2A of the rotor core 2 and gates 20 configured to individually communicate with lower openings 4A of the respective magnet insertion holes 4. The cull plate 18 is disposed under the gate plate 16 and has cull openings 22 configured to communicate with the respective gates 20 and resin pots 80 of a later-described magnet embedded core manufacturing device 60.

The second plate 14 is constituted of a rectangular flat plate, and opposes an upper end surface 2B of the rotor core 2. The second plate 14 supports closure members 26 for the respective magnet insertion holes 4 by associated bolts 24 in a suspended manner so as to be movable vertically. Each closure member 26 includes a bottom surface 26A having an area larger than that of the upper opening 4B of the magnet insertion hole 4 and capable of contacting against the upper end surface 2B of the rotor core 2. The lower limit position of each closure member 26 is determined by contacting of a head 24A of the associated bolt 24 against a shoulder-shaped bottom of an associated bolt through hole 14A formed in the second plate 14.

A compression coil spring 28 is attached between the second plate 14 and each closure member 26. The compression coil spring 28 is individually provided for each closure member 26, and urges the closure member 26 toward the first plate 12. Namely, the closure members 26 and the compression coil springs 28 are provided for the respective magnet insertion holes 4. It is to be noted that, as shown in FIG. 4, each closure member 26 is supported by two bolts 24, and the compression coil springs 28 are provided such that two compression coil springs 28 are provided in parallel for each closure member 26.

The first plate 12 is larger in size than the second plate 14, and includes a rectangular frame-shaped projecting portion 17 that projects outward from an outer edge of the second plate 14 in plan view.

The first plate 12 and the second plate 14 are coupled to each other by coupling members 30 in four positions at front and rear on left and right sides in a state where the rotor core 2 is sandwiched between the first plate 12 and the closure members 26.

Details of the structure of the coupling members 30 that couple the first plate 12 and the second plate 14 to each other will now be described. Each coupling member 30 includes a rod portion 30A and a pair of flange portions 30B, 30C respectively provided at lower and upper ends of the rod portion 30A. The first plate 12 and the second plate 14 are formed with cutout portions 32, 34 each extending linearly in the left and right direction and opening at left or right outer edge of the associated plates 12, 14. The cutout portions 32, 34 are provided to be aligned vertically in four positions at front and rear on left and right sides, and as shown in enlarged partial perspective views (A) and (B) in FIG. 3, respectively include recessed grooves 32A, 34A which the flange portions 30B, 30C can engage, and slit-shaped openings 32B, 34B formed in the bottoms of the recessed grooves 32A, 34A such that the rod portion 30A can pass therethrough, and the flange portions 30B, 30C contact against shoulder portions 32C, 34C defined by parts of the recessed grooves 32A, 34A remaining on both sides of the openings 32B, 34B.

Thus, by engagement of each coupling member 30 with the first plate 12 and the second plate 14, the coupling members 30 couple the first plate 12 and the second plate 14 to each other such that a spring force of the compression coil spring 28 becomes a prescribed value. Thereby, each closure member 26 is pressed against the upper end surface 2B of the rotor core 2 by the spring force of the compression coil spring 28 and closes the upper opening 4B of the corresponding magnet insertion hole 4.

The flange portions 30B, 30C are entirely received in the recessed grooves 32A, 34A, and do not protrude below the first plate 12 and above the second plate 14.

Figure 5:
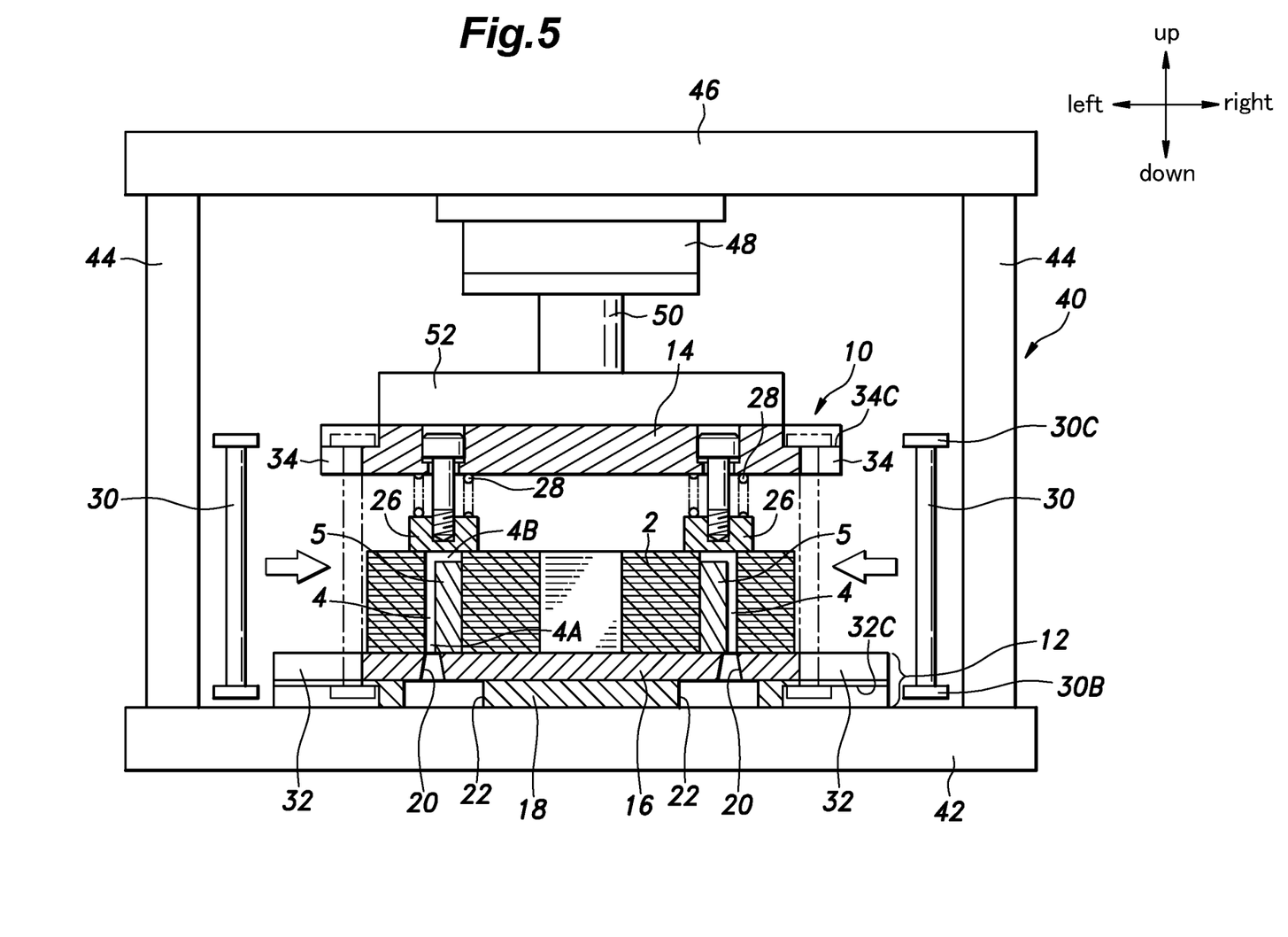
FIG. 5 is an explanatory diagram showing a rotor core retaining step performed in the rotor core retaining jig according to the embodiment.

The rotor core 2 can be set in the rotor core retaining jig 10 by use of a core setting device 40 shown in FIG. 5. The core setting device 40 includes a flat plate-shaped base 42, a flat plate-shaped top member 46 disposed above the base 42 to oppose the same by multiple post members 44 extending upright from the base 42, a hydraulic pressurizing device (cylinder-piston device) 48 mounted on the bottom surface of the top member 46, and a flat plate-shaped pressurizing plate 52 mounted on a piston rod 50 of the pressurizing device 48.

In the setting of the rotor core 2 in the rotor core retaining jig 10 using the core setting device 40, first, the first plate 12 is placed on the base 42, the magnets 5 are inserted into the respective magnet insertion holes 4, and then, the second plate 14 is placed on the rotor core 2 such that each closure member 26 is aligned with the associated magnet insertion hole 4.

Subsequently, the pressurizing device 48 is driven to press the pressurizing plate 52 against the second plate 14 to thereby cause compressive deformation in each compression coil spring 28. In this state, the flange portions 30B, 30C of the coupling members 30 are inserted into the corresponding cutout portions 32, 34 from both left and right sides. Thereafter, when the pressing of the second plate 14 by the pressurizing plate 52 is released, the spring force of the compression coil spring 28 causes the flange portions 30B, 30C to be pressed against the shoulder portions 32C, 34C.

Thereby, the first plate 12 and the second plate 14 are coupled to each other by the coupling members 30, with the spring force of each compression coil spring 28 having the prescribed value. As a result, as shown in FIG. 3, the rotor core 2 can be treated, together with the rotor core retaining jig 10, as a sub-assembly in that the opening 4B of each magnet insertion hole 4 is closed by the corresponding closure member 26 with a pressing force resulting from the spring force of the compression coil spring 28.

Next, with reference to FIGS. 6 to 9, description will be made of the magnet embedded core manufacturing device 60.

Figure 6:
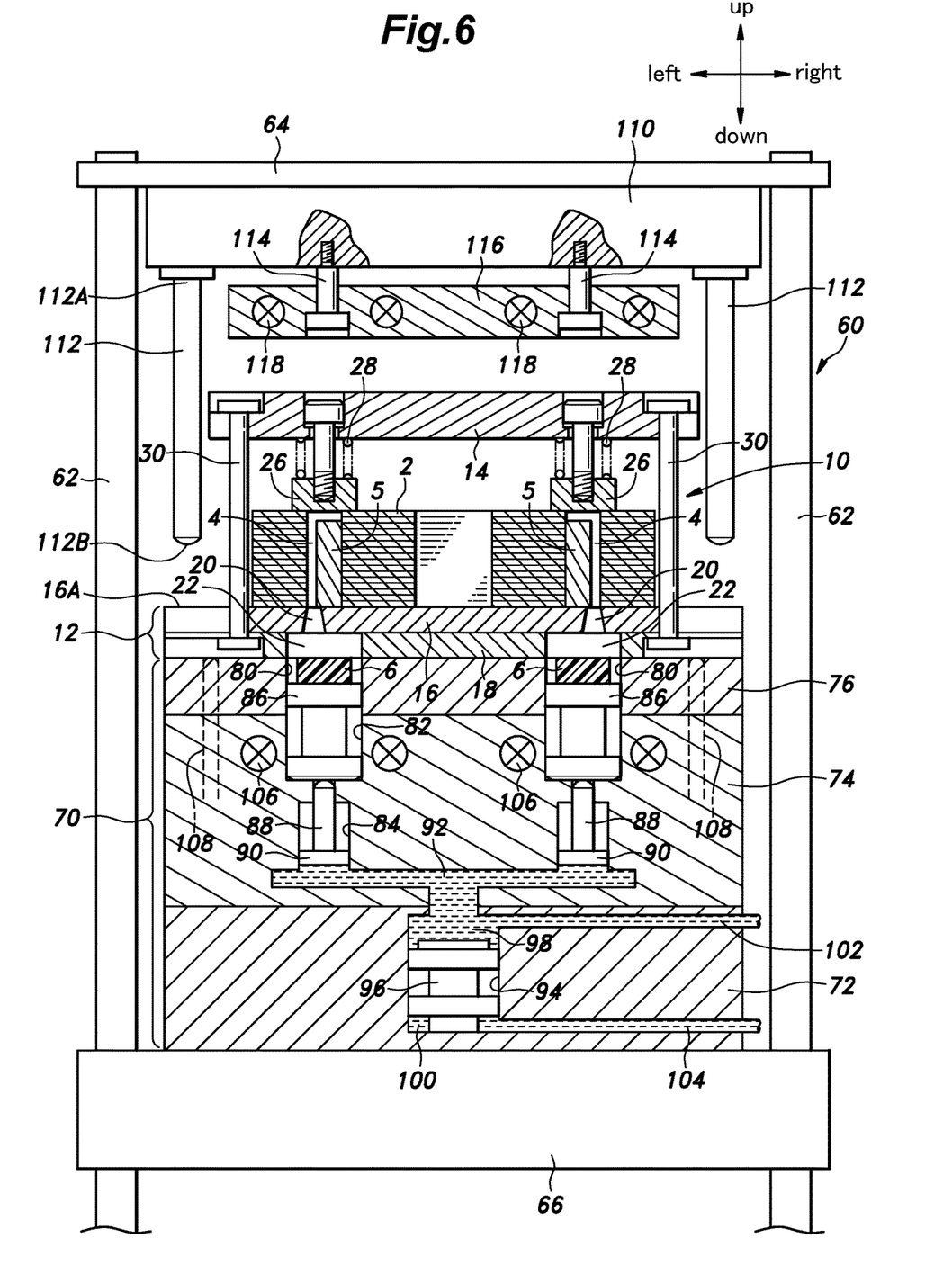
FIG. 6 is a vertical sectional view showing a lowered state of a lower movable member of a manufacturing device of the magnet embedded core according to the embodiment of the present invention.

The magnet embedded core manufacturing device 60 includes multiple post members 62 that extend vertically, a fixed platen 64 fixed to upper ends of the post members 62, and a movable platen 66 that is movable vertically and guided by the post members 62. The movable platen 66 is driven in the vertical direction by a drive device (not shown) using hydraulic pressure or the like, and can move toward and away from the fixed platen 64.

A first member 70 is mounted on the movable platen 66. The first member 70 is constituted of an assembly in which a lower member 72, an intermediate member 74, and an upper member 76 are stacked. On the upper member 76, the sub-assembly of the rotor core 2 and the rotor core retaining jig 10 is placed.

The upper member 76 is formed with multiple resin pots 80 corresponding to the respective magnet insertion holes 4 of the rotor core 2. Each resin pot 80 opens in the top surface of the upper member 76 to communicate with the corresponding cull opening 22. The intermediate member 74 is formed with plunger chambers 82 and push rod chambers 84 communicating with the associated resin pots 80. As a resin introducing device for introducing molten resin from the resin pots 80 into the magnet insertion holes 4 via the gates 20, each plunger chamber 82 is provided with a plunger 86 to be vertically movable and each push rod chamber 84 is provided with a push rod 88 to be vertically movable. The resin pots 80, the plunger chambers 82, and the cull openings 22 are bores having the same inner diameter, and each plunger 86 can move into the corresponding cull opening 22 from the corresponding plunger chamber 82.

Solid resin 6 having a block shape is placed on the plunger 86 in each resin pot 80.

Each push rod 88 contacts against the corresponding plunger 86 at an upper end thereof to move the plunger 86 upward. Each push rod 88 has a pressure receiving flange 90 at a lower end thereof, and a hydraulic pressure of hydraulic oil in a manifold oil passage 92 formed in the intermediate member 74 is applied on each pressure receiving flange 90. The lower member 72 is formed with a cylinder chamber 94. The cylinder chamber 94 is provided with a piston 96 so as to be movable vertically. The piston 96 defines an upper oil chamber 98 on an upper side thereof such that the upper oil chamber 98 communicates with the manifold oil passage 92, and defines a lower oil chamber 100 on an underside thereof. The upper oil chamber 98 and the lower oil chamber 100 are connected to a hydraulic pressure source (not shown) by oil passages 102, 104 and the like formed in the lower member 72.

In the first member 70, a heater 106 for heating the first member 70 is embedded. Ejection rods 108 that can protrude above the top surface of the upper member 76 are provided in the first member 70. The ejection rods 108 are caused to protrude above the top surface of the upper member 76 by a drive device (not shown) such as an air cylinder, a hydraulic cylinder, servo, etc. or descending movement of the movable platen 66.

A second member 110 is mounted to a lower part of the fixed platen 64. The second member 110 opposes the first member 70 via the rotor core retaining jig 10 on the first member 70, and is relatively movable toward and away from the first member 70 as the movable platen 66 is movable toward and away from the fixed platen 64.

Figure 7:
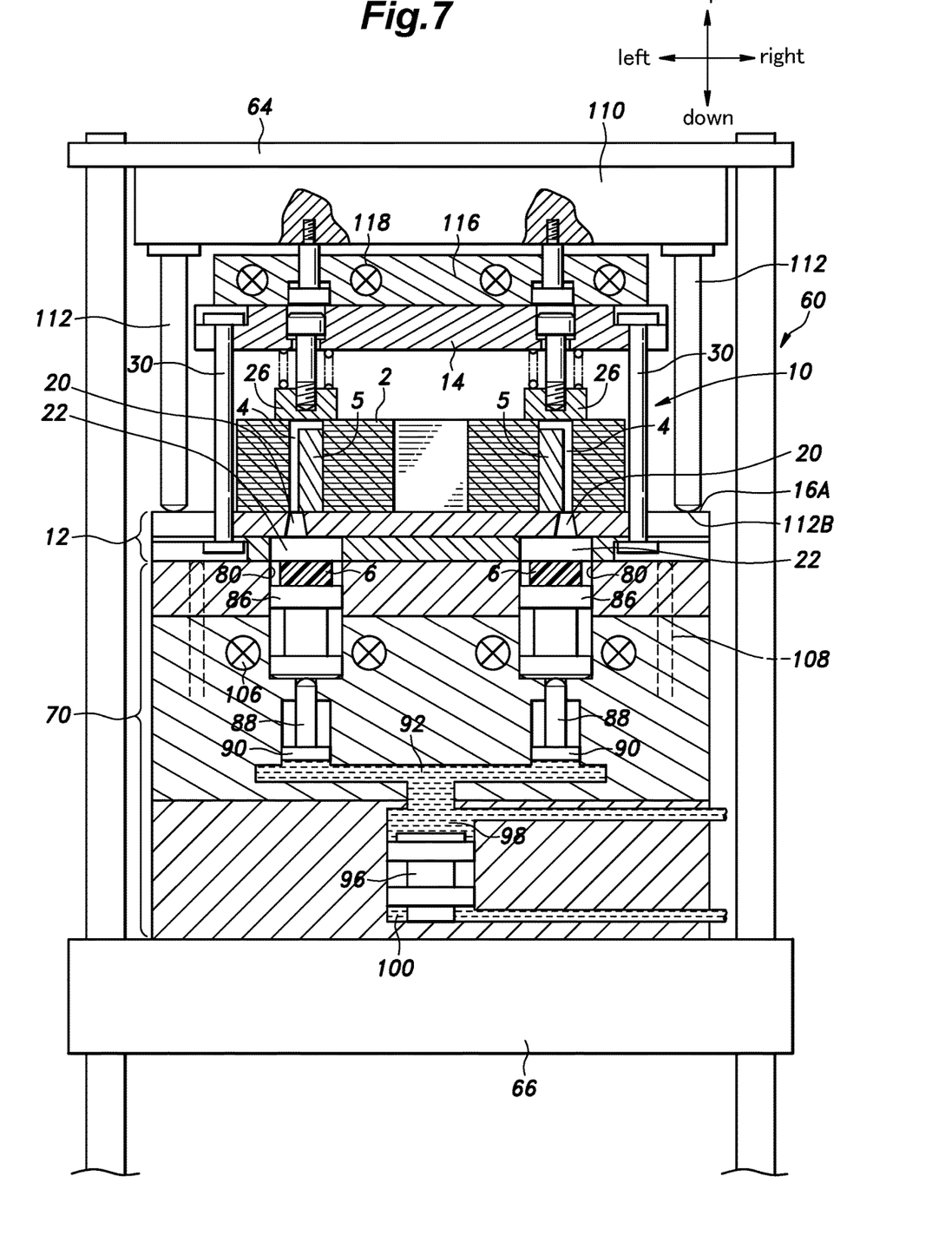
FIG. 7 is a vertical sectional view showing a raised state of the lower movable member of the manufacturing device.

Base ends 112A of multiple pressing members 112 each consisting of a rod-like member are fixed to the second member 110. Each pressing member 112 extends downward from the base end 112A, is positioned between the second member 110 and the first plate 12, and includes a free end 112B that is capable of contacting against the top surface 16A of the gate plate 16 of the first plate 12. As shown in FIG. 7, each pressing member 112 contacts against the top surface 16A of the projecting portion 17 of the gate plate 16 when the movable platen 66 is moved upward, and presses the first plate 12 against the first member 70 with the pressurizing force transmitted from the second member 110 to the first plate 12.

Thereby, the force for pressing the first plate 12 against the first member 70 is determined by the lifting force (die clamping force) of the movable platen 66 separately from the force for pressing the closure members 26 against the rotor core 2, and the connection between the cull openings 22 and the resin pots 80 can be achieved without a gap under the force pressing the first plate 12 against the first member 70.

The second member 110 supports a heater block 116 by use of suspension bolts 114 so as to be movable vertically relative to the second member 110. The heater block 116 is provided with heaters 118 embedded therein. As shown in FIG. 7, when the movable platen 66 is lifted, the heater block 116 contacts against the second plate 14 and heats the resin 6 via the rotor core retaining jig 10.

Figure 8:
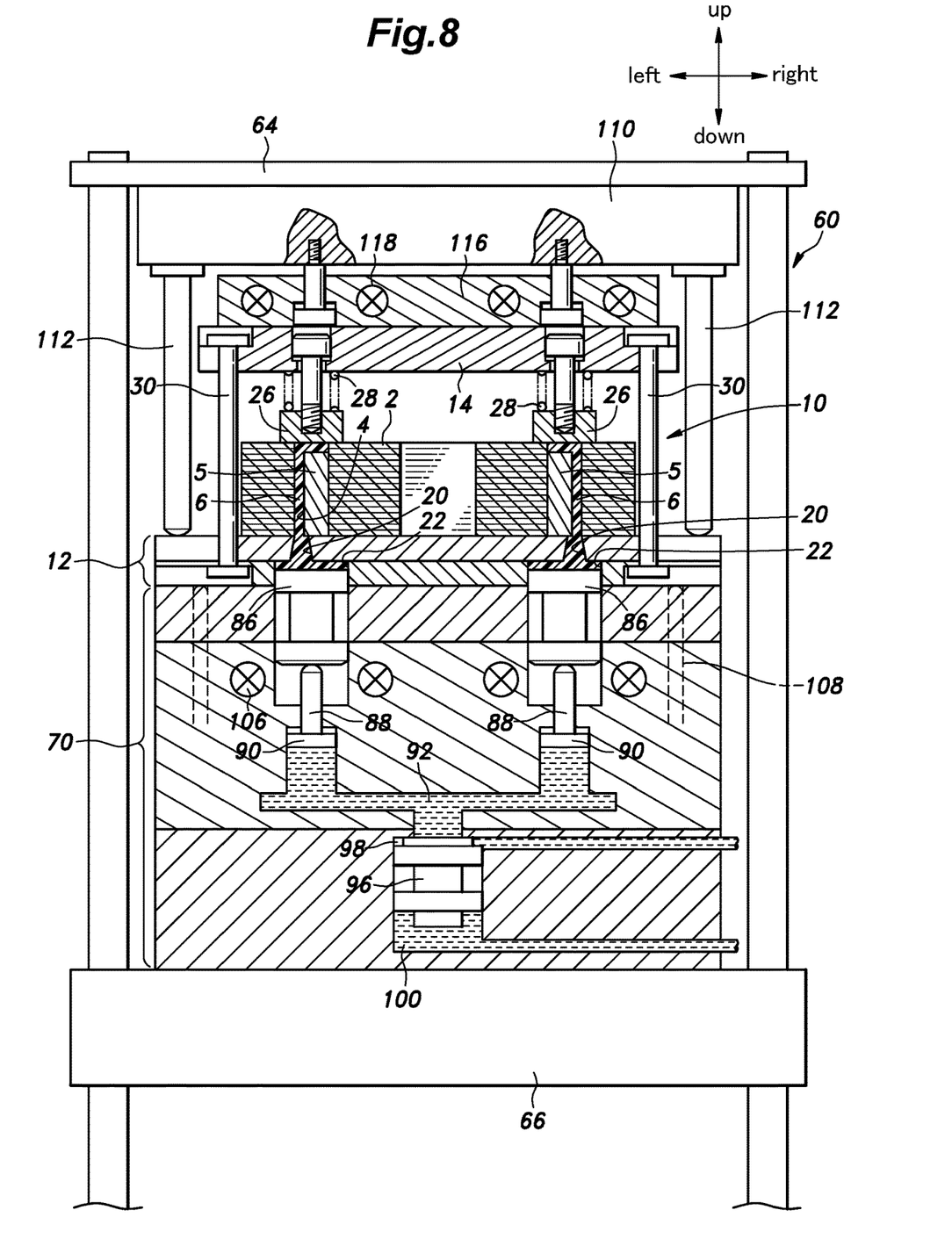
FIG. 8 is a vertical sectional view showing a resin pressurizing state of the manufacturing device.

The solid resin 6 in each resin pot 80 is molten when heated by the heater 106 or the like. Under this state, as shown in FIG. 8, a hydraulic pressure is supplied from the hydraulic pressure source (not shown) to the lower oil chamber 100, and the piston 96 is moved upward so that the pressure is distributed evenly to the pressure receiving flanges 90 and the push rods 88 with the hydraulic oil in the manifold oil passage 92 serving as a pressure medium. Thereby, the plungers 86 are lifted, and the molten resin 6 in each resin pot 80 passes through the corresponding cull opening 22 and gate 20 to be press-fed into the corresponding magnet insertion hole 4 and fill the same.

Because the force pressing the first plate 12 against the first member 70 can be independently set to an appropriate value without excess or insufficiency by adjusting the lifting force of the movable platen 66, the connection between the cull openings 22 and the resin pots 80 can be achieved under an appropriate pressing force that presses the first plate 12 against the first member 70. Thereby, in the process of press-feeding the molten resin 6 from the resin pots 80 to the magnet insertion holes 4, leakage of the molten resin 6 to the outside through an interface between the first plate 12 and the first member 70 is suppressed, and occurrence of burrs at the interface is suppressed.

Because the closure members 26 are pressed against the rotor core 2 by the spring force of the compression coil spring 28 separately from the lifting force of the movable platen 66, the force pressing the closure members 26 against the rotor core 2 can be independently set to an appropriate value without excess or insufficiency, separately from the force pressing the first plate 12 against the first member 70. Thereby, without causing deformation such as a warp in the rotor core 2, the closure of the openings 4B of the magnet insertion holes 4 and the connection between the openings 4A of the magnet insertion holes 4 and the gates 20 can be achieved with an appropriate value of the force pressing the closure members 26 against the rotor core 2. Thereby, in the process of press-feeding the molten resin 6 from the resin pots 80 to the magnet insertion holes 4, leakage of the molten resin 6 to the outside from the openings 4B of the magnet insertion holes 4 or through the interface between the openings 4A of the magnet insertion holes 4 and the gates 20 is suppressed, and occurrence of burrs at the interface or around the openings 4B is suppressed.

Figure 9:
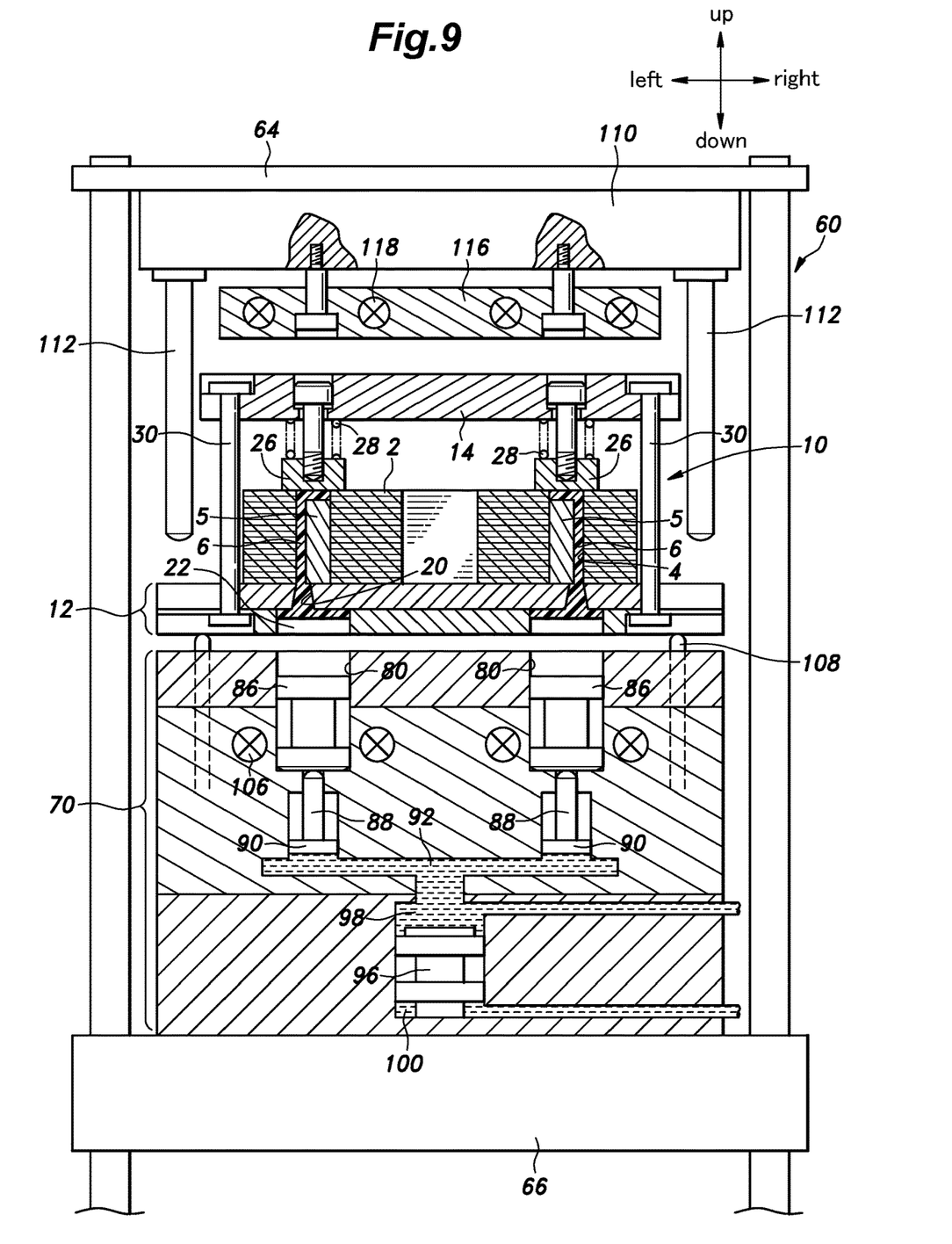
FIG. 9 is a vertical sectional view showing an ejection state of the manufacturing device.

After filling of the resin 6 is completed, the rotor core 2 is removed together with the rotor core retaining jig 10 subsequent to lifting of the ejection rods 108 to lift the rotor core retaining jig 10 above the first member 70, as shown in FIG. 9.

As is appreciated from the foregoing description, the manufacturing method for the magnet embedded core 1 according to the present embodiment includes, in summary, a rotor core placing step of placing the rotor core 2 on the first plate 12 of the rotor core retaining jig 10 such that the magnet insertion holes 4 are aligned with the gates 20, a plate placing step of placing the second plate 14 of the rotor core retaining jig 10 on the rotor core 2 to close the openings 4B of the magnet insertion holes 4 with the closure members 26, a plate coupling step of coupling the first plate 12 and the second plate 14 to each other with the coupling members 30, with the rotor core 2 being sandwiched by the first plate 12 and the second plate 14, a jig placing step of placing the rotor core retaining jig 10 on the first member 70 provided with the resin pots 80 such that the gates 20 communicate with the resin pots 80, a plate pressing step of pressing the first plate 12 against the first member 70 using the pressing members 112 provided between the first member 70 and the second member 110, the first plate 12 being pressed against the first member 70 in response to relative movement of the second member 110 toward the first member 70, and a resin introducing step of introducing molten resin from the resin pots 80 into the magnet insertion holes 4 via the gates 20.

The manufacturing method further includes, prior to the plate placing step, a resin inserting step of inserting the solid resin 6 into the resin pots 80, and the resin introducing step includes a melting step of causing the solid resin inserted into the resin pots 80 to melt in the resin pots 80 and a pressurizing step of pressurizing the molten resin 6 to introduce (press-feed) the molten resin into the magnet insertion holes 4.

Thereby, in the manufacturing method for the magnet embedded core 1 according to the present embodiment, the force pressing the first plate 12 against the first member 70 and the force pressing the closure members 26 against the rotor core 2 can be set individually, and occurrence of burrs can be suppressed without causing deformation such as a warp in the rotor core 2. In addition, the use of the solid resin 6 can reduce wasteful consumption of the resin 6.

Figure 10:
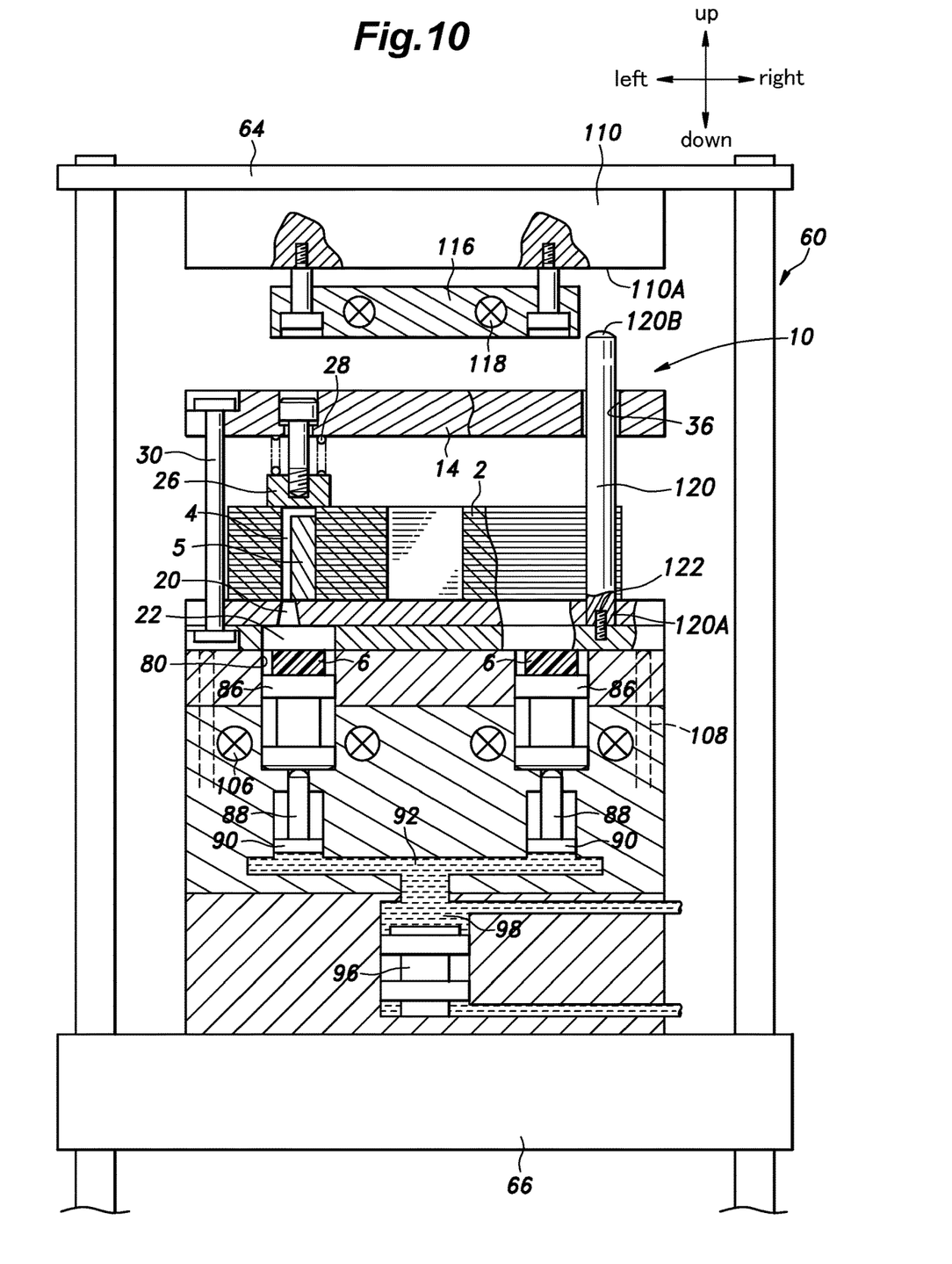
FIG. 10 is a vertical sectional view of a rotor core retaining jig and a manufacturing device of a magnet embedded core according to another embodiment.
Figure 11:
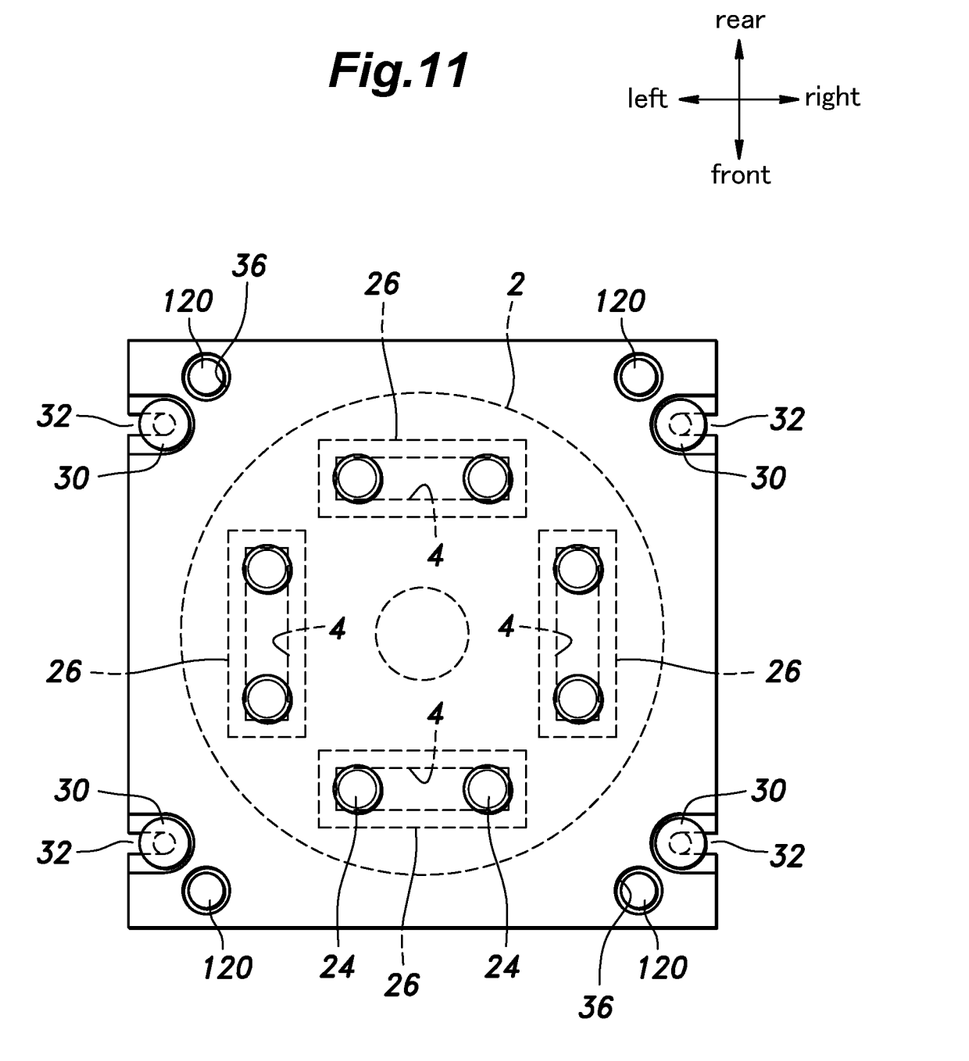
FIG. 11 is a plan view of the rotor core retaining jig according to the other embodiment.

Another embodiment of the magnet embedded core manufacturing device 60 is described with reference to FIGS. 10 and 11. It is to be noted that in FIGS. 10 and 11, the parts corresponding to those in FIGS. 4 and 6 are denoted by the same reference signs as those in FIGS. 4 and 6, and the description thereof is omitted.

In this embodiment, each pressing member 120 consisting of a rod-like member has a base end 120A fixed to the first plate 12 by means of a screw 122 and a free end 120B extending through a through hole 36 formed in the second plate 14 of the rotor core retaining jig 10 so as to be capable of contacting against a bottom surface 110A of the second member 110.

When the movable platen 66 is lifted, the pressing members 112 contact against the bottom surface 110A of the second member 110, so that the first plate 12 is pressed against the first member 70 by the pressurizing force transmitted from the second member 110 to the first plate 12.

Thus, in this embodiment also, similar effects as in the above embodiment can be obtained by use of the rotor core retaining jig 10 similar to that of the above embodiment. Further, in this embodiment, the projecting portion 17 of the first plate 12 in the above embodiment is unnecessary, and thus, the first plate 12 can be made smaller.

In the foregoing, the present invention has been described in terms of specific embodiments, but these embodiments are for illustrative purposes only, and the present invention is not limited by these embodiments.

For instance, the magnet embedded core manufacturing device 60 may be arranged upside down. The gate plate 16 and the cull plate 18 may be configured by a single plate-shaped member.

The solid resin used in the present invention does not have to be in the form of blocks, and may be in the forms of pellet, powder or granule. In the foregoing embodiments, the resin exemplarily consisted of thermosetting resin, but the present invention is not limited to this, and thermoplastic resin may also be used. When thermoplastic resin is used, the curing step is performed as a cooling step, instead of the thermal curing step used for the thermosetting resin.

In the foregoing embodiments, the magnet 5 in each magnet insertion hole 4 was exemplarily offset in the inward direction. However, the position of the magnet 5 in each magnet insertion hole 4 can be freely changed.

For instance, the closure members 26 do not necessarily have to be provided corresponding to the respective magnet insertion holes 4, and may be divided corresponding to respective sets of adjoining multiple magnet insertion holes 4 or corresponding to respective sets of magnet insertion holes 4 that correspond to magnetic poles, and the compression coil springs 28 may be provided corresponding to the respective closure members 26. Namely, the closure member 26 may be divided into multiple closure members each corresponding to at least one magnet insertion hole 4, and the compression springs 28 may be provided corresponding to the respective closure members 26. The arrangement and number of the coupling members 30 may be other than those shown in the foregoing embodiments. The driving of the push rods 88, the pistons 96, etc. does not have to be performed using hydraulic pressure, and may be performed electrically using an electromagnetic mechanism, etc. Each magnet 5 may be placed centrally in the corresponding magnet insertion hole 4 in plan view. Also, the entire device may be arranged upside down.

The constituent element of the manufacturing method for the magnet embedded core of the present invention shown in the foregoing embodiments are not entirely essential, but may be suitably omitted or substituted without departing from the scope of the present invention.

GLOSSARY

1 magnet embedded core
2 rotor core
2A lower end surface
2B upper end surface
3 shaft hole
4 magnet insertion hole
4A opening
4B opening
5 magnet
6 resin
10 rotor core retaining jig
12 first plate
14 second plate
14A bolt through hole
16 gate plate
16A top surface
17 projecting portion
18 cull plate
20 gate
22 cull opening
24 bolt
24A head
26 closure member
26A bottom surface
28 compression coil spring
30 coupling member
30A rod portion
30B flange portion
30C flange portion
32 cutout portion
32A recessed groove
32B opening
32C shoulder portion
34 cutout portion
34A recessed groove
34B opening
34C shoulder portion
40 core setting device
42 base
44 post member
46 top member
48 pressurizing device
50 piston rod
52 pressurizing plate
60 magnet embedded core manufacturing device
62 post member
64 fixed platen
66 movable platen
70 first member
72 lower member
74 intermediate member
76 upper member
80 resin pot
82 plunger chamber
84 push rod chamber
86 plunger
88 push rod
90 pressure receiving flange
92 manifold oil passage
94 cylinder chamber
96 piston
98 upper oil chamber
100 lower oil chamber
102 oil passage
104 oil passage
106 heater
108 ejection rod
110 second member
110A bottom surface
112 pressing member
112A base end
112B free end
114 suspension bolt
116 heater block
118 heater
120 pressing member
120A base end
120B free end
122 screw

The invention claimed is:

1. A retaining jig for a rotor core including a magnet insertion hole forming a through hole defining openings on both of end surfaces of the rotor core in an axial direction, comprising:

a first plate configured to contact against one of the end surfaces of the rotor core, the first plate defining a gate extending through the first plate such that the gate is configured to communicate with the corresponding opening of the magnet insertion hole;

a second plate configured to oppose an other of the end surfaces of the rotor core;

a closure member coupled to the second plate via a compression spring member provided between a surface of the second plate facing the first plate and the closure member, the closure member being positioned to be aligned with the magnet insertion hole and configured to contact the other of the end surfaces of the rotor core to close the opening of the magnet insertion hole on the other of the end surfaces; and a coupling member that couples the first plate and the second plate to each other such that the closure member closes the opening and a spring force of the compression spring member becomes a prescribed value.

2. The retaining jig for a rotor core according to claim 1, wherein the rotor core comprises multiple magnet insertion holes, and the closure member is divided into multiple closure members each corresponding to at least one of the magnet insertion holes, and the compression spring is provided for each closure member.

3. The retaining jig for a rotor core according to claim 1, wherein the coupling member comprises a rod portion and a pair of flange portions provided on either end of the rod portion, and the first plate and the second plate include cutout portions each opening at an outer edge of the corresponding plate and defining a shoulder portion against which the corresponding flange portion contacts.

4. The retaining jig for the rotor core according to claim 1, wherein the gate is defined to be aligned with the magnet insertion hole.

5. A manufacturing device for a magnet embedded core comprising a rotor core provided with a magnet insertion hole forming a through hole defining openings on both of end surfaces of the rotor core in an axial direction, a magnet disposed in the magnet insertion hole, and resin filling the magnet insertion hole, the manufacturing device comprising a rotor core retaining jig which comprises:
- a first plate configured to contact against one of the end surfaces of the rotor core, the first plate defining a gate extending through the first plate such that the gate is configured to communicate with the corresponding opening of the magnet insertion hole;
- a second plate configured to oppose an other of the end surfaces of the rotor core;
- a closure member coupled to the second plate via a compression spring member provided between a surface of the second plate facing the first plate and the closure member, the closure member being positioned to be aligned with the magnet insertion hole and configured to contact the other of the end surfaces of the rotor core to close the opening of the magnet insertion hole on the other of the end surfaces; and
- a coupling member that couples the first plate and the second plate to each other such that the closure member closes the opening and a spring force of the compression spring member becomes a prescribed value, wherein the manufacturing device further comprises:
a first member contacting against the first plate of the rotor core retaining jig and provided with a resin pot configured to communicate with the gate;
a second member opposing the first member via the rotor core retaining jig and relatively movable toward and away from the first member;
a resin introducing device for introducing molten resin from the resin pot into the magnet insertion hole via the gate; and
a pressing member located between the second member and the first plate to press the first plate against the first member by a pressurizing force transmitted from the second member to the first plate.

6. The manufacturing device for the magnet embedded core according to claim 5, wherein the pressing member consists of a rod-like member having a base end fixed to the second member and a free end capable of contacting against the first plate.

7. The manufacturing device for the magnet embedded core according to claim 5, wherein the pressing member consists of a rod-like member having a base end fixed to the first plate and a free end capable of contacting against the second member.

8. The manufacturing device for the magnet embedded core according to claim 5, wherein the gate is defined to be aligned with the magnet insertion hole.

9. A manufacturing method operatively associated with a rotor core retaining jig to manufacture a magnet embedded core comprising a rotor core provided with a magnet insertion hole forming a through hole defining openings on both of end surfaces of the rotor core in an axial direction, a magnet disposed in the magnet insertion hole, and resin filling the magnet insertion hole, wherein said method comprises steps of:
providing the rotor core retaining jig including:
- a first plate configured to contact against one of the end surfaces of the rotor core, the first plate defining a gate extending through the first plate such that the gate is configured to communicate with the corresponding opening of the magnet insertion hole;
- a second plate configured to oppose an other of the end surfaces of the rotor core;
- a closure member coupled to the second plate via a compression spring member provided between a surface of the second plate facing the first plate and the closure member, the closure member being positioned to be aligned with the magnet insertion hole and configured to contact the other of the end surfaces of the rotor core to close the opening of the magnet insertion hole on the other of the end surfaces; and
- a coupling member that couples the first plate and the second plate to each other such that the closure member closes the opening and a spring force of the compression spring member becomes a prescribed value;

placing the rotor core on the first plate of the rotor core retaining jig such that the magnet insertion hole is aligned with the gate;
placing the second plate on the rotor core to close the opening of the magnet insertion hole with the closure member;
coupling the first plate and the second plate to each other with the coupling member, with the rotor core being sandwiched by the first plate and the second plate;
placing the rotor core retaining jig on a first member provided with a resin pot such that the gate communicates with the resin pot;
pressing the first plate against the first member using a pressing member provided between the first member and a second member relatively movable toward and away from the first member, the first plate being pressed against the first member in response to relative movement of the second member toward the first member; and
introducing molten resin from the resin pot into the magnet insertion hole via the gate.

10. The manufacturing method according to claim 9, wherein the method comprises, prior to placing the second plate on the rotor core, inserting solid resin into the resin pot, and
introducing and melting resin by causing the solid resin inserted into the resin pot to melt in the resin pot and pressurizing the molten resin to introduce the molten resin into the magnet insertion hole.

11. The manufacturing method according to claim 9, wherein the gate is defined to be aligned with the magnet insertion hole.

* * * * *